United States Patent
Jiang et al.

(10) Patent No.: US 11,401,456 B2
(45) Date of Patent: Aug. 2, 2022

(54) ENHANCED OIL RECOVERY METHOD BY NANOFLUID-ASSISTED $CO_2$ HUFF-N-PUFF

(71) Applicants: TSINGHUA UNIVERSITY, Beijing (CN); SHANXI RESEARCH INSTITUTE FOR CLEAN ENERGY, TSINGHUA UNIVERSITY, Shanxi (CN)

(72) Inventors: Peixue Jiang, Beijing (CN); Ruina Xu, Beijing (CN); Feng Huang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 87 days.

(21) Appl. No.: 17/010,938

(22) Filed: Sep. 3, 2020

(65) Prior Publication Data
US 2021/0198556 A1      Jul. 1, 2021

(30) Foreign Application Priority Data

Dec. 31, 2019  (CN) .......................... 201911414288.6

(51) Int. Cl.
*C09K 8/594*   (2006.01)
*B82Y 30/00*   (2011.01)

(52) U.S. Cl.
CPC ............... *C09K 8/594* (2013.01); *B82Y 30/00* (2013.01); *C09K 2208/10* (2013.01)

(58) Field of Classification Search
CPC ...................................................... E21B 43/18
See application file for complete search history.

(56) References Cited

U.S. PATENT DOCUMENTS

| 5,381,863 | A | * | 1/1995 | Wehner | ................. | E21B 43/164 |
| | | | | | | 166/402 |
| 2010/0012331 | A1 | * | 1/2010 | Larter | ................... | E21B 43/243 |
| | | | | | | 166/401 |

(Continued)

FOREIGN PATENT DOCUMENTS

| CN | 104481475 A | 4/2015 |
| CN | 110130859 A | 8/2019 |

OTHER PUBLICATIONS

Chinese First Office Action dated Jul. 2, 2020 from corresponding Chinese Patent Application No. 201911414288.6, 5 pages.

*Primary Examiner* — William D Hutton, Jr.
*Assistant Examiner* — Avi T Skaist
(74) *Attorney, Agent, or Firm* — Ohlandt, Greeley, Ruggiero and Perle, LLP

(57) ABSTRACT

The present invention provides an enhanced oil recovery method by nanofluid-assisted $CO_2$ huff-n-puff. A nanofluid is injected into an injection well in an oil reservoir formation having hydrophilic wetting characteristics, and soaking is performed; in the soaking stage, after the nanofluid tends to replace crude oil to occupy dead-ends of fractures and pores, and liquid $CO_2$ is injected; and in the process of production, $CO_2$ originally dissolved in the formation fluid reaches a supersaturated state. As a result, $CO_2$ preferentially nucleates at the nanofluid side to generate $CO_2$ bubbles, grows and expands with the continuous reduction of formation pressure, and pushes crude oil near the dead-ends of fractures and pores to move outward, thereby improving the recovery efficiency.

3 Claims, 2 Drawing Sheets

(56) References Cited

U.S. PATENT DOCUMENTS

2019/0093462 A1\* 3/2019 Watts ........................ C09K 8/62
2019/0136119 A1\* 5/2019 Aslam ................... E21B 43/168

\* cited by examiner

ENHANCED OIL RECOVERY METHOD BY NANOFLUID-ASSISTED $CO_2$ HUFF-N-PUFF

TECHNICAL FIELD

The present invention relates to the technical field of enhanced crude oil recovery, and in particular, to an enhanced oil recovery method by nanofluid-assisted $CO_2$ huff-n-puff.

BACKGROUND

In crude oil exploitation, $CO_2$ huff-n-puff is one of the widely used technologies for enhanced oil recovery. $CO_2$ huff-n-puff is increasingly applied to the exploitation of unconventional oil reservoirs, such as the exploitation of tight oil reservoirs. When $CO_2$ is used for exploitation by huff-n-puff, $CO_2$ injected into the formation will dissolve in crude oil, which can effectively reduce crude oil viscosity, cause crude oil expansion, reduce interfacial tension and supplement formation energy. At the same time, $CO_2$ solution gas drive caused by depressurization during well opening and production is also conducive to improving crude oil recovery efficiency.

However, the current $CO_2$ huff-n-puff technique for enhanced oil recovery is relatively rough and has some shortcomings. During the process of $CO_2$ injection, soaking and production, the most critical behavior of $CO_2$ supersaturation nucleation and precipitation cannot be controlled, which causes the supersaturated $CO_2$ to nucleate randomly in the formation fracture-matrix porous media structure; and the $CO_2$ bubbles that grow and expand subsequently are also randomly located in the formation porous media. In the process of production and depressurization, the relatively randomly generated and growing $CO_2$ bubbles make it difficult to effectively exploit the crude oil near the dead-ends of fractures and pores in the porous media of the formation. Even if $CO_2$ huff-n-puff for cyclic exploitation is performed many times, its effect on improving the recovery of this part of crude oil is still limited.

SUMMARY

The present invention provides an enhanced oil recovery method by nanofluid-assisted $CO_2$ huff-n-puff so as to improve the crude oil recovery efficiency.

To achieve the above objective, the present invention provides the following solution:

an enhanced oil recovery method by nanofluid-assisted $CO_2$ huff-n-puff, including:

using a nanofluid to displace crude oil from an injection well to a production well;

when the crude oil obtained by displacement contains the nanofluid, closing the injection well and the production well, and performing first soaking;

when the first soaking reaches a first set time, opening the injection well and the production well, and using liquid $CO_2$ to displace crude oil from the injection well to the production well through the formation fracture-matrix porous structure;

when the crude oil obtained by displacement contains the injected $CO_2$, closing the production well, and continuing to inject the liquid $CO_2$ into the injection well, and when the bottom hole pressure of the injection well is equal to the miscibility pressure of $CO_2$ and the formation crude oil, closing the injection well and performing second soaking; and when the second soaking reaches a second set time, opening the production well to complete the exploitation of crude oil.

Optionally, the opening of the production well specifically includes:

opening the production well at a specific speed to reduce the formation pressure at a set rate.

Optionally, the set rate is 0.5 MPa/h.

Optionally, the first set time is one week.

Optionally, the second set time is two weeks.

According to a specific example provided by the present invention, the enhanced oil recovery method by nanofluid-assisted $CO_2$ huff-n-puff has the following technical effects: a nanofluid is injected into an injection well of an oil reservoir formation having hydrophilic wetting characteristics, and soaking is performed; in the soaking stage, after the nanofluid tends to replace crude oil to occupy the dead-ends of fractures and pores, and liquid $CO_2$ is injected; and in the process of production and depressurization, $CO_2$ originally dissolved in the formation fluid reaches a supersaturated state. As a result, $CO_2$ preferentially nucleates at the nanofluid side to generate $CO_2$ bubbles, grows and expands with the continuous reduction of formation pressure, and pushes crude oil near the dead-ends of fractures and pores to move outward, thereby improving the recovery efficiency.

BRIEF DESCRIPTION OF THE DRAWINGS

To describe the technical solutions in the examples of the present invention or in the prior art more clearly, the following briefly describes the accompanying drawings required for the examples. Apparently, the accompanying drawings in the following description show merely some examples of the present invention, and a person of ordinary skill in the art may still derive other accompanying drawings from these accompanying drawings without creative efforts.

DETAILED DESCRIPTION

The following clearly and completely describes the technical solutions in the examples of the present invention with reference to accompanying drawings in the examples of the present invention. Apparently, the described examples are merely some rather than all of the examples of the present invention. All other examples obtained by a person of ordinary skill in the art based on the examples of the present invention without creative efforts shall fall within the protection scope of the present invention.

The present invention provides an enhanced oil recovery method by nanofluid-assisted $CO_2$ huff-n-puff so as to improve the crude oil recovery efficiency.

In order to make the above objectives, features, and advantages of the present invention more understandable, the present invention will be further described in detail below with reference to the accompanying drawings and detailed implementations.

Figure 1:
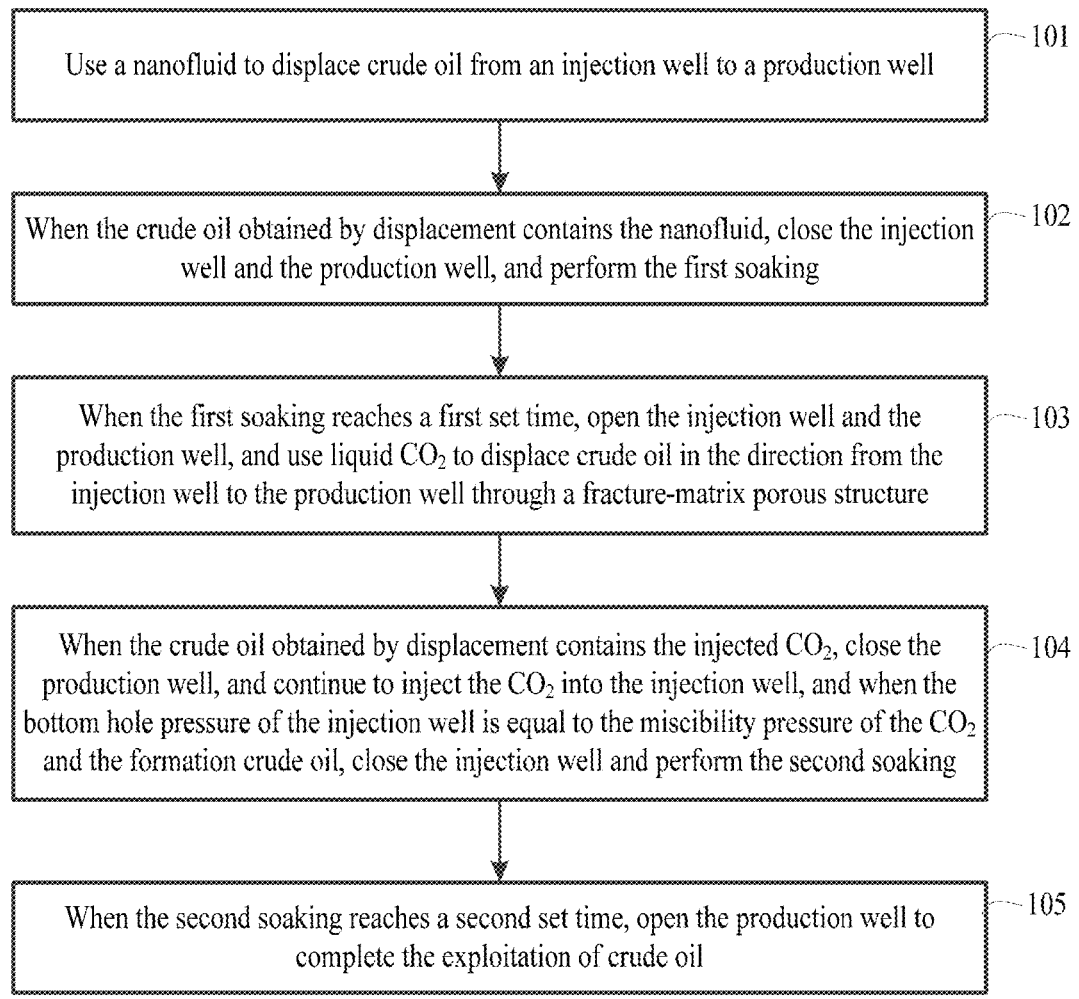
FIG. 1 is a flowchart of an enhanced oil recovery method by nanofluid-assisted $CO_2$ huff-n-puff according to an example of the present invention.

The enhanced oil recovery method by nanofluid-assisted $CO_2$ huff-n-puff provided by the present invention is suitable for oil reservoir formations having strong hydrophilic wetting characteristics. As shown in FIG. 1, the enhanced oil recovery method by nanofluid-assisted $CO_2$ huff-n-puff includes the following steps.

S101: Use a nanofluid to displace crude oil from an injection well to a production well.

This displacement process is similar to water flooding for enhanced crude oil recovery. Moreover, nanoparticles in the nanofluid used in this step need to have weak hydrophilic characteristics or hydrophobic wetting characteristics.

S102: When the crude oil obtained by displacement contains the nanofluid, close the injection well and the production well, and perform first soaking.

S103: When the first soaking reaches a first set time, open the injection well and the production well, and use liquid $CO_2$ to displace crude oil from the injection well to the production well through the formation fracture-matrix porous structure.

Figure 2:
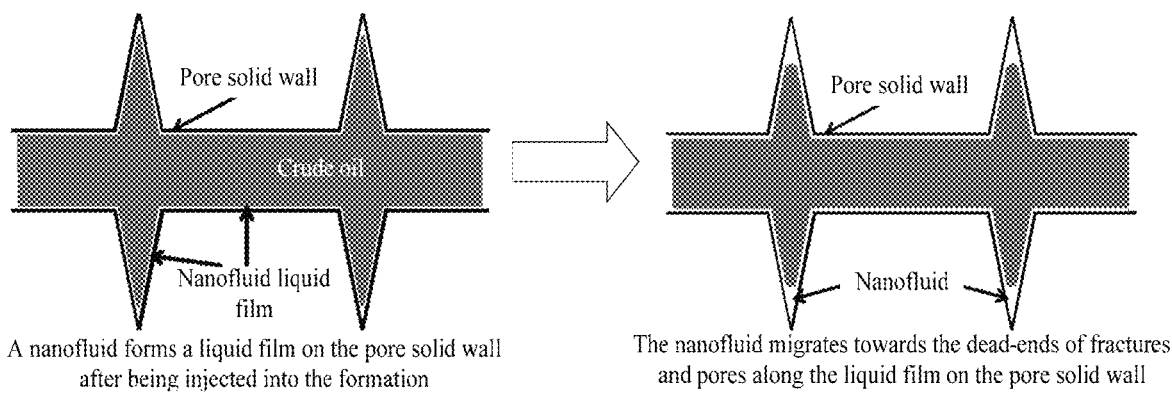
FIG. 2 is a schematic diagram of a process in which a nanofluid replaces crude oil to occupy the dead-ends of fractures and pores according to an example of the present invention.

In the formation having hydrophilic wetting characteristics, a water-based nanofluid easily forms a liquid film on the wall surface of a formation pore structure under the action of capillary force, and tends to stably exist at the dead-ends of fractures and pores with small sizes. Therefore, in the stage of first soaking, the nanofluid entering the formation fracture-matrix porous media further changes its distribution and migrates to the dead-ends of fractures and pores to drive away the original crude oil in these positions. The process of using the nanofluid to drive away the original crude oil out of the positions is shown in FIG. 2.

In the foregoing process of displacing the crude oil with $CO_2$, $CO_2$/crude oil/water-based nanofluid multiphase fluids flow in the oil reservoir formation, and in this case the production well can produce a mixture of crude oil, a water-based nanofluid and $CO_2$.

S104: When the crude oil obtained by displacement contains the injected $CO_2$ (or when $CO_2$ is continuously produced), close the production well, and continue to inject the liquid $CO_2$ into the injection well; and when a bottom hole pressure of the injection well is equal to miscibility pressure of $CO_2$ and the formation crude oil (or when the bottom hole pressure of the injection well meets the requirement of lower than the formation fracture pressure, it is controlled to be as close as possible to the minimum miscibility pressure of $CO_2$ and formation crude oil), close the injection well and perform second soaking.

During the injection process, the amount of injected $CO_2$ makes the dissolved $CO_2$ in the formation crude oil reach a saturated state. In the stage of the second soaking, the $CO_2$ fluid injected into the formation is gradually dissolved into the crude oil and the water-based nanofluid, which can make the crude oil and the nanofluid in the porous media of the formation approach the saturated state.

S105: When the second soaking reaches a second set time, open the production well to complete the exploitation of crude oil.

Figure 3:
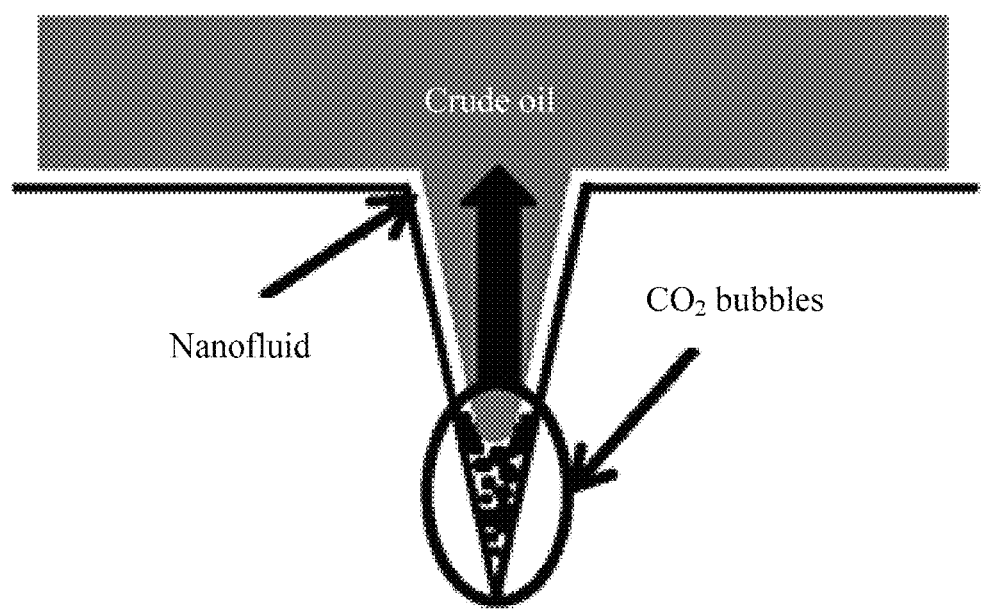
FIG. 3 is a schematic diagram of a process in which $CO_2$ nucleates and grows at the side of a nanofluid, and pushes crude oil to flow from inside to outside at the dead-ends of fractures and pores according to an example of the present invention.

In this process, when the production well is opened, the well opening speed of the production well needs to be controlled so that the formation pressure drop rate is kept below 0.5 MPa/h. As formation pressure drops, $CO_2$ will reach a supersaturated state in both crude oil and the water-based nanofluid. In the process of $CO_2$ supersaturation nucleation and precipitation, nanoparticles in the nanofluid can be used as the core of $CO_2$ supersaturation nucleation to some extent. The weak hydrophilic or hydrophobic wetting characteristics of the surfaces of the nanoparticles is also conducive to the nucleation of $CO_2$ bubbles on the surface, so $CO_2$ will be more prone to nucleate and precipitate in the nanofluid. At the same time, the three-phase contact line of a nanofluid/crude oil/formation pore solid wall is more favorable for $CO_2$ supersaturation nucleation and precipitation than the two-phase interface of a crude oil/formation pore solid wall. Controlling the rate of decline of formation pressure is beneficial to enlarging the supersaturation nucleation advantage of $CO_2$ in the nanofluid and at the three-phase contact line. $CO_2$ preferentially nucleates inside the nanofluid occupying the dead-ends of fractures and pores and at the three-phase contact line to generate bubbles. In the subsequent depressurization, these bubbles will also take advantage in the growth process and expand continuously, and will displace crude oil outward from the dead-ends of fractures and pores in the expansion and growth process. This process is shown in FIG. 3. However, it is often difficult to effectively exploit crude oil near the dead-ends of fractures and pores in the original $CO_2$ huff-n-puff exploitation technology.

S104 to S105 can be continuously repeated when the enhanced oil recovery method by nanofluid-assisted $CO_2$ huff-n-puff according to the present invention is adopted.

However, with the increase of cyclic exploitation times, part of the nanofluid existing in the formation fracture-matrix porous media will be exploited from the production well together with crude oil. In this case, S101 and S102 need to be repeated to continue injecting the nanofluid into the formation and perform soaking to supplement the amount of the nanofluid in the porous media so as to improve the oil recovery efficiency.

In the enhanced oil recovery method by nanofluid-assisted $CO_2$ huff-n-puff according to the present invention, the first set time is one week. The second set time is two weeks. Because the formation structures of different oil reservoirs may differ greatly, the above two set soaking times can also be set according to actual needs.

Compared with the prior art, the enhanced oil recovery method by nanofluid-assisted $CO_2$ huff-n-puff according to the present invention has the following advantages:

In the existing technology for enhanced oil recovery by $CO_2$ huff-n-puff, the location of $CO_2$ supersaturation nucleation is relatively random and difficult to control, making it difficult to exploit crude oil at some pore structures, especially crude oil near the dead-ends of fractures and pores.

The method provided by the present invention can effectively utilize crude oil near the dead-ends of fractures and pores by injecting the water-based nanofluid into the porous media of the formation, thereby improving the efficiency of oil recovery by $CO_2$ huff-n-puff.

The oil recovery efficiency can be improved because there are a large number of nanofluid liquid films on the pore solid wall in the formation having hydrophilic wetting characteristics. The interfacial tension between the nanofluid and crude oil drives the nanofluid to migrate towards the dead-ends of fractures and pores with smaller sizes in the soaking stage, and gradually replace crude oil to occupy the dead-ends of fractures and pores. In the depressurization process of $CO_2$ huff-n-puff, the particles in the nanofluid can be used as nucleation cores, and the weak hydrophilic or hydrophobic wetting characteristics of the nanoparticle surface are also conducive to promoting the nucleation and precipitation of $CO_2$ bubbles, while the three-phase contact line of the nanofluid/crude oil/pore solid wall is also more conducive to the nucleation and precipitation of $CO_2$ bubbles than the two-phase interface of the crude oil-pore wall.

Therefore, the method provided by the present invention enables more $CO_2$ bubbles to be nucleated and precipitated at the nanofluid side and the three-phase contact line of the nanofluid/crude oil/pore solid wall. As the formation pressure drops continuously, $CO_2$ bubbles continue to grow and expand, and then drive crude oil to flow from inside to outside from the dead-ends of fractures and pores, so that crude oil near the dead-ends of fractures and pores can be effectively exploited, and the efficiency of oil recovery by $CO_2$ huff-n-puff is improved.

Each example of the specification is described in a progressive manner, each example focuses on the difference from other examples, and the same and similar parts between the examples may refer to each other.

In this paper, several examples are used for illustration of the principles and implementations of the present invention. The description of the foregoing examples is used to help understand the method of the present invention and the core ideas thereof. In addition, those of ordinary skill in the art can make various modifications in terms of specific implementations and scope of application in accordance with the teachings of the present invention. In conclusion, the content of the present specification shall not be construed as a limitation to the present invention.

What is claimed is:

1. An enhanced oil recovery method by nanofluid-assisted $CO_2$ huff-n-puff, comprising:

using a nanofluid to displace crude oil from an injection well to a production well;

when the crude oil obtained by displacement contains the nanofluid, closing the injection well and the production well, and performing first soaking;

when the first soaking reaches a first set time, opening the injection well and the production well, and using liquid $CO_2$ to displace crude oil from the injection well to the production well;

when the crude oil obtained by displacement contains the injected $CO_2$, closing the production well, and continuing to inject the liquid $CO_2$ into the injection well, and when a bottom hole pressure of the injection well is equal to the miscibility pressure of the liquid $CO_2$ and the formation crude oil, closing the injection well and performing second soaking; and when the second soaking reaches a second set time, opening the production well to complete the exploitation of crude oil, wherein the opening of the production well comprises opening the production well at a specific speed to reduce the formation pressure at a set rate of 0.5 MPa/h or lower.

2. The enhanced oil recovery method by nanofluid-assisted $CO_2$ huff-n-puff according to claim 1, wherein the first set time is one week.

3. The enhanced oil recovery method by nanofluid-assisted $CO_2$ huff-n-puff according to claim 1, wherein the second set time is two weeks.

* * * * *